J. Tiffany.
Steam Generator.
Nº 88,345.      Patented Mar. 30, 1869.
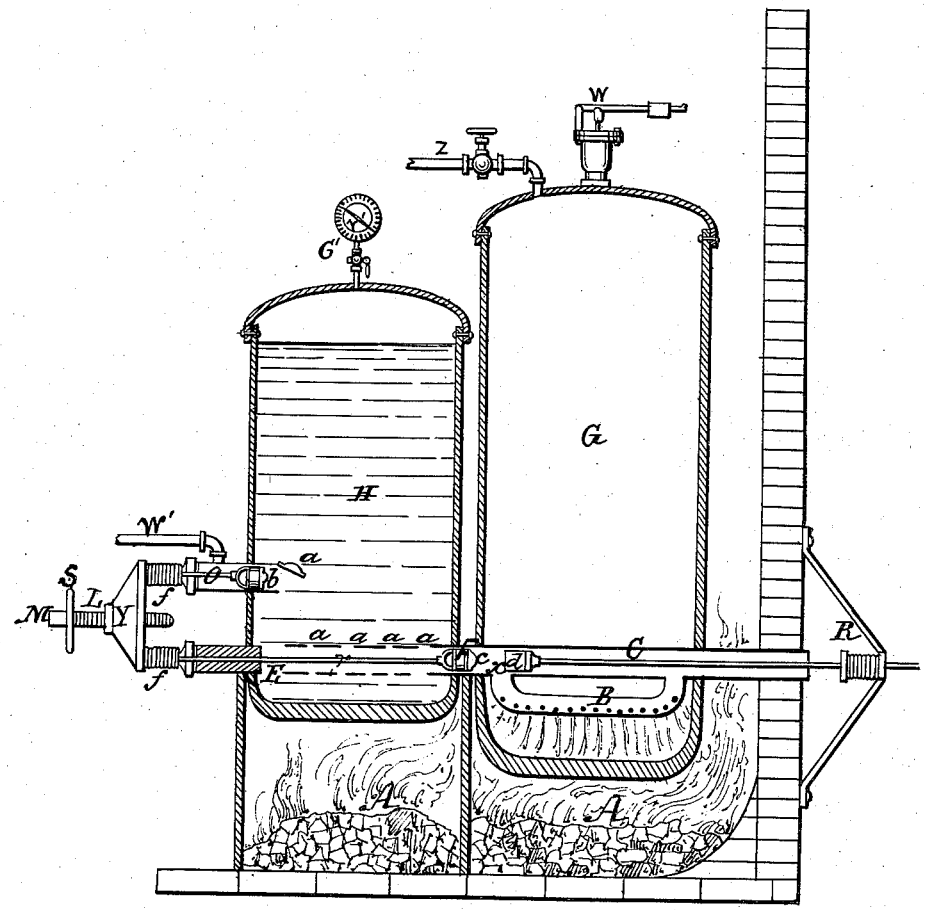
Witnesses.
Daniel Ketchum
Henry L. Gladding
Inventor.
Joel Tiffany

JOEL TIFFANY, OF ALBANY, NEW YORK.

Letters Patent No. 88,345, dated March 30, 1869.

IMPROVEMENT IN STEAM-GENERATORS.

The Schedule referred to in these Letters Patent and making part of the same.

*To all whom it may concern:*

Be it known that I, JOEL TIFFANY, of the city and county of Albany, and State of New York, have invented a new and useful Improvement in Apparatus for Generating Superheated Steam for Mechanical Purposes; and I hereby declare that the following is a full and exact description of the same, reference being had to the accompanying drawings, and to the letters of reference marked thereon, making a part of this specification.

In the accompanying drawings—

Figure 1 represents a vertical sectional view of my said improvement, showing the vessel H, for heating the water, and the vessel G, for superheating the steam, and the means of communication between them.

My invention consists, first, in devices for heating the water, as hereinafter set forth, to be used in the generation of superheated steam.

Hitherto, the general practice has been to employ but one vessel, both for generating and superheating the steam. Where cold or moderately warm water is ejected upon heated surfaces, to produce superheated steam, the temperature of such surfaces becomes subject to repeated and almost instantaneous fluctuations of temperature, detrimental to the durable strength of the material employed.

To obviate this difficulty, I employ a small vessel, or pipe, for the purpose of first heating the water up to or above the temperature at which water passes to steam. For this purpose I use a close vessel, that I may carry the temperature of the water up to or very nearly up to the temperature necessary to produce the steam in its superheated condition. The temperature to which I heat the water will vary, according to the amount of pressure I wish to maintain in my steam-superheater; that is, the temperature of the water should approximate in pressure very nearly to that sought to be maintained within the generator.

A difficulty in the generation and use of superheated steam has been experienced in regulating the supply. It is well known that the proportion of water in bulk, to superheated steam of a given density, is fixed, and that the quantity of superheated steam to be generated, temperature being sufficient, depends upon the quantity of water supplied for that purpose. Where the limits of the generator are known, the temperature employed known, the consumption of steam in a given time known, the supply of water to furnish the steam can be determined. Thus, by my improvement, I regulate the quantity of steam to be generated by the quantity of heated water to be injected into the generator in a given time, or at every stroke of the pump used for that purpose. I so adjust my force-pump communicating between the two vessels, that I can eject and inject, at each stroke of the piston, any desired quantity of heated water, from the least to the greatest amount ever required for such purpose.

In the accompanying drawing, H represents the boiler for heating the water, and the generator and superheater of the steam, each in position over the fire in the furnace. The vessel H is the one in which the water is first heated, that is, heated above the temperature producing steam.

G represents the vessel in which the heated water is converted into superheated steam.

In the arrangement represented in the accompanying drawings, the water in the vessel H is injected into the vessel G by means of a force-pump, as represented in said fig. 1, near the bottom of the vessel H.

It will be observed in the drawing that a hollow rod, a part of which constitutes the barrel of the force-pump, as seen at F, passes entirely through the boiler H and the superheater G, the object of which is to inject heated water, at any desired temperature, into the superheater, regardless of the amount of pressure existing in the generator at the time.

The force-pump above is constructed and operates as follows:

F is the barrel of the pump, which is a part of the pipe extending entirely through the vessels H and G.

E is that part of the barrel through which the piston r moves to operate the plunger and valve C.

When the plunger is drawn back, the valve C opens, and the heated water passes into the barrel F, and is retained there by the valve d, which is held to its place at x by the spring R, attached to the rod connected with the valve d, as shown in the drawing.

It is necessary to keep the piston r drawn back when not forcing the water into the vessel G, so as to leave the chamber F open and filled with heated water. This piston is drawn back by means of a spring. Should the chamber F be *in vacuo* for an instant, it would fill with steam.

The quantity of superheated steam produced, depends upon the quantity of superheated water injected into the superheater G, and as the amount of pressure needed to be maintained will vary according to the amount of power desired, it becomes necessary to establish means for exactly gauging the quantity of superheated water to be injected into the vessel G. This is accomplished by an arrangement by means of which the quantity of motion communicated to the piston r is determined.

The piston is made to move forward by the application of the necessary force at the end of the attachment at M.

The quantity of motion communicated to the piston is measured by the distance from the pulley S, on the screw-rod L, from the shoulder of the cross-piece Y, for it is so arranged that when the pulley S rests upon the shoulder of cross-head Y, the propelling-force just touches the end of the rod L at M, without acting upon it; but by turning back the screw L, by means of the pulley S, any distance, that distance measures the amount of motion that will be communicated to the piston r by the propelling-force applied.

The backward motion of the piston r may be produced in several ways. In the accompanying drawing it is represented as being produced by means of the spiral springs f f.

The boiler H is to be supplied with an amount of cold water to be heated equal to the amount ejected therefrom into the vessel G. This should be done at each stroke of the piston. The accompanying drawing represents one method of accomplishing such result. The pump for forcing cold water into the vessel H is represented as being of the same capacity with that which injects heated water into the vessel G. These two pumps are so attached together by the cross-head Y, that they each receive the same quantity of motion, be the same more or less, and consequently each throws the same quantity of water at each stroke of the piston. The cold water is supplied to the pump by means of the pipe W'.

The steam-gauge is seen at the top of the vessel H, at G'.

The safety-valve is seen at the top of the vessel G, at W.

The communication between the superheater G and the engine is by means of the pipe represented at Z.

The furnace, with the exit-flues, is seen beneath the vessels H and G, and the ignited fuel is seen at A A.

The operation of the above improvement may be described as follows:

The boiler H is filled nearly full of water by any of the methods well known. A fire is kindled under the same, and the temperature in the boiler is raised to that at least of generating steam, or higher, according to the pressure sought to be produced and maintained in the vessel G. In the mean time, a fire is likewise kindled in the furnace underneath the vessel G, and the same is heated to the desired temperature. When the desired temperature has been obtained both in the vessels H and G, heated water is injected into the vessel G by means of the force-pump communicating between the two, or by any other suitable means, and is thrown upon the internal surface of the superheater, and converted by the process into superheated steam. When the piston is drawn back so as to fill the barrel F with heated water, the valve d closes the opening x by moving up to c. When the piston is forced forward, the valve c closes, and the water in the barrel of the pump F forces back the valve d, along the barrel O, until the opening x permits the heated water to pass down into the perforated pipe B, when it is forced out in spray or steam upon the bottom surface of the vessel G, and superheated steam is produced.

The pipe, where it passes through the vessel H, represents openings into the boiler at o o o o, for the purpose of keeping the same filled with water behind the plunger, as seen at F, to pass through the valve c into the barrel F, on the backward motion of the plunger, or piston-rod r.

Having thus fully described my said invention, I will proceed to state my claim.

1. I claim the vessels H and G, two or more, constructed and combined substantially as herein set forth.

2. I claim the force-pump F, in combination with the boiler H and vessel G, substantially in the manner described.

3. I claim the pump F, in combination with the pump O and the cross-head Y, substantially in the manner and for the purpose above described.

4. I claim the screw-rod L, in combination with the cross-head Y and pumps O and F, substantially as above described.

JOEL TIFFANY.

Witnesses:
DANIEL KETCHUM,
HENRY L. GLADDING.